United States Patent [19]
Kusmierz et al.

[11] Patent Number: 5,858,219
[45] Date of Patent: Jan. 12, 1999

[54] COOLING TOWER WATER TREATMENT SYSTEM

[76] Inventors: Joel E. Kusmierz, 5535 Sunfish Lake Rd., Rockford, Mich. 49341; George R. Babb, 2565 44th St. SE., Kentwood, Mich. 49512

[21] Appl. No.: 966,274

[22] Filed: Nov. 7, 1997

Related U.S. Application Data

[62] Division of Ser. No. 743,394, Nov. 4, 1996.

[51] Int. Cl.⁶ .................................. C02F 1/70; C02F 1/72
[52] U.S. Cl. .................... 210/167; 210/175; 210/194; 210/259; 210/275; 210/278; 210/279; 210/757; 210/758; 210/765
[58] Field of Search .................. 210/167, 172, 210/175, 194, 259, 269, 275, 277, 278, 279, 757, 758, 765

[56] References Cited

U.S. PATENT DOCUMENTS

| | | | |
|---|---|---|---|
| 4,642,192 | 2/1987 | Heskett | 210/638 |
| 4,968,431 | 11/1990 | Bohnsack et al. | 210/669 |
| 5,094,739 | 3/1992 | Kump | 204/150 |
| 5,112,504 | 5/1992 | Johnson | 210/792 |
| 5,122,274 | 6/1992 | Heskett | 210/638 |
| 5,135,654 | 8/1992 | Heskett | 210/638 |
| 5,198,118 | 3/1993 | Heskett | 210/638 |
| 5,269,932 | 12/1993 | Heskett | 210/638 |
| 5,275,737 | 1/1994 | Heskett | 210/638 |
| 5,277,829 | 1/1994 | Ward et al. | 210/792 |
| 5,314,623 | 5/1994 | Heskett | 210/638 |
| 5,415,770 | 5/1995 | Heskett | 210/202 |
| 5,433,856 | 7/1995 | Heskett | 210/638 |
| 5,510,034 | 4/1996 | Heskett | 210/638 |

*Primary Examiner*—Robert Popovics
*Attorney, Agent, or Firm*—Richard A. Gaffin; Benita J. Rohm; Raphael A. Monsanto

[57] ABSTRACT

A cooling tower water treatment system removes contaminants include chlorine, calcium carbonate as calcite, and microorganisms from water in the system with redox media in a fluidized bed. The treatment system includes a treatment bed, in the form of a column, having a reaction chamber of a first diameter and a retention chamber of a second diameter, the second diameter being greater than the first diameter. Redox media, in the reaction chamber, is fluidized by water flowing in a direction countercurrent to gravity and is held in place, without the use of screens or filters, by a reduction in flow rate of the fluidizing media resulting from the larger diameter of the retention chamber. Preferably, the treatment system includes a physical filtration unit, such as an automatic backwashing sand filter, to prevent entry of particulates and scale into the reaction chamber.

5 Claims, 2 Drawing Sheets

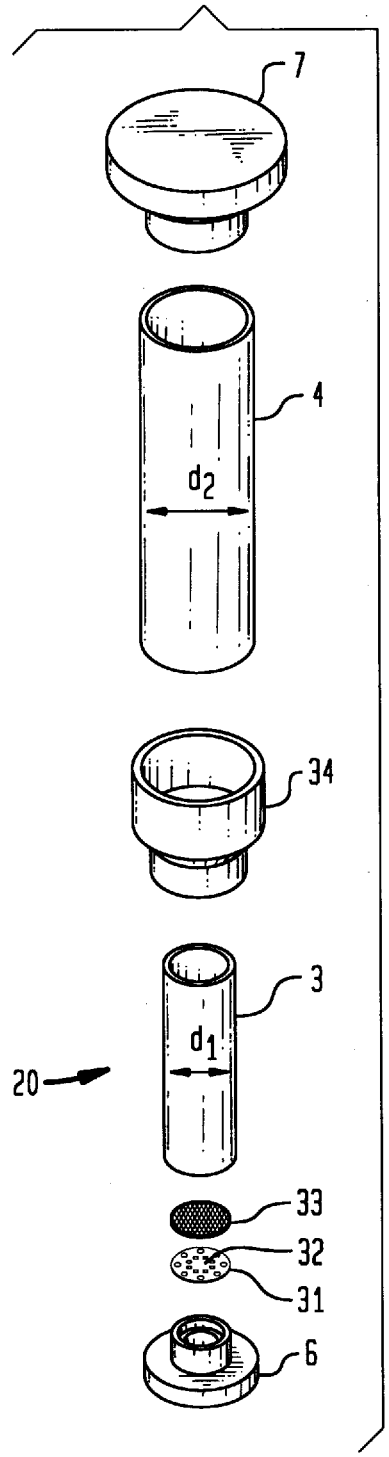

COOLING TOWER WATER TREATMENT SYSTEM

This is a division of co-pending application Ser. No. 08/743,394 filed on Nov. 4, 1996, this application being assigned to the assignee hereof.

BACKGROUND OF THE INVENTION

1. Field of the Invention

This invention relates generally to fluid treatment systems for industrial use, and more particularly, to an improved cooling tower water treatment system using redox media.

2. Description of the Related Art

Water is the most commonly used medium for removing heat from industrial equipment. Water has excellent heat transfer capability which is reversible so that the water can be cooled and reused. Typically, water is recycled by the use of a cooling tower which allows a portion of the water to be evaporated. Since water is rarely pure, contaminants in the water are concentrated during the evaporation process. Concentration of the contaminants leads to multiple problems such as scaling, corrosion and fouling by algae, bacteria, and fungi, the treatment of which require the use of chemicals and/or frequent maintenance.

In the past, water was typically treated with chemical conditioners to control scaling, corrosion and biofouling. Chelators and complexers were added to control the formation of scale, inhibitors were added to control corrosion, and biocides were added to control biofouling. In addition to the foregoing, other additives, such as buffers and pH control additives are frequently used. The use of these chemicals adds expense, increases effort to monitor and maintain appropriate chemical levels, and creates disposal problems. Non-chemical systems have been developed, such as magnetic systems and ozone generators, but these have proven to be expensive and, at best, only marginally effective. Ozone systems, for example, have a beneficial effect on the control of biofouling, but have a limited effect on the control of scale formation and corrosion protection.

A unique oxidation/reduction (redox) media has been discovered for treating water by the galvanic reaction that results when the water contacts bimetallic redox media. The bimetallic alloy used in the media for water treatment is preferably a high purity alloy of copper and zinc in an appropriate ratio. The redox media is described more particularly, for example, in U.S. Pat. Nos. 5,510,034; 5,433,856; and related patents. Redox potential (ORP) is a measure of the readiness to part with electrons, and is measured in millivolts (mV). Zinc is more reactive than copper and is more electropositive. In the preferred redox filter media, copper is the permanent cathode and zinc is the sacrificial anode. A single pass through copper-zinc redox filter media rapidly changes the redox potential of water from +200 mV to -500 mV. This change has a dramatic effect on most bacteriologic, solubility, and ionic reactions. The redox media can remove dissolved gases such as chlorine, hydrogen sulfide and methane. It can also remove virtually any soluble heavy metal, help prevent mineral scale accumulation and reduce levels of microorganisms.

More specifically, when cooling tower water is exposed to the redox media, the flow of electrons alters the crystalline structure of the scale-forming compounds. The most common scale-forming compound is calcium carbonate or calcite. When combined with carbon dioxide dissolved from the air, and exposed to heat, calcite is deposited in the heat exchangers, pipes, pumps, reservoirs, and towers used in the cooling system. Left uncontrolled, calcite will continue to grow upon itself until a thick layer of scale is formed. A 0.1" thick deposit of calcite, for example, will reduce the heat transfer ability of a heat exchange by about 40%. The modification of ORP produced by the redox media causes the calcium to precipitate as fine particles of a carbonate compound which is spherical or rod-shaped with rounded edges. Unlike the coarse crystalline calcite scale, the carbonate precipitate cannot grow upon itself and can be removed by filtration.

The medium controls biofouling by two mechanisms. The ORP change produced by contact with the media results in an electrolytic field which most microorganisms cannot survive. Second, hydroxyl radicals and peroxides are formed from some of the water molecules which also adversely impact microorganisms. Finally, the corrosion of metallic surfaces is mitigated by the stabilization of pH to non-corrosive alkaline levels of between 8.0 and 8.5 through the generation of hydroxyl radicals by the redox media. Additionally, the negative impact on bacterial growth prevents the generation of organic acids by the bacteria.

Despite these advantages, the use of the aforementioned redox media has been accompanied by the several disadvantages. In typical prior art systems, the redox media is supplied in a form similar to steel wool. This material is formed around a mandrel. Water flows from the outside of the chamber, through the media, and through the mandrel. In another embodiment, the redox media is supplied in the form of a foam-like product which has been formed into discs. The water flows through a series of these discs for the appropriate contact time. The wool and foam products, being held in a static position, become clogged over time with particulate matter which is precipitated out of the water. Not only does this lead to premature replacement of the media, but over time as clogging occurs, the surface area is reduced and flow is restricted. As a result of this deterioration, performance is reduced and the problems relating to scale, biofouling, and corrosion can recur.

In order to overcome the foregoing problem, a granular media has been used with a downflow pattern in a pressure vessel. While this also results in a buildup of trapped particulates, periodic backwashing allows their removal. This system is an improvement over the wool and foam systems described hereinabove where the media is permanently fouled, but results in diminished performance between backwashing cycles. Another disadvantage of this system is the loss of media due to flow rate of backwashing necessary for particle removal.

It is, therefore, an object of this invention to provide a cooling tower treatment system which does not rely on chemicals for conditioning the cooling water and is inexpensive and simple to maintain.

It is another object of this invention to provide a cooling tower water treatment system which uses redox media efficiently without significant loss of performance between backwashing cycles.

It is also an object of this invention to provide a cooling tower treatment system which maximizes the life of the redox media and system components.

It is still a further object of this invention to provide a cooling tower treatment system which exhibits consistent performance levels over its lifetime.

SUMMARY OF THE INVENTION

The foregoing and other objects are achieved by this invention which provides a device for treating fluids, such as water from a cooling tower. The device includes a treatment bed wherein the fluid is brought into contact with treating media, preferably redox media in a course, granular form. Water, or other fluid to be treated, flows upward, or countercurrent to the effect of gravity on the treating media, through a lower portion of the treatment bed, or the reaction chamber, fluidizing the treating media contained therein so that particulates of foreign material are not trapped in the media. The treatment bed has an upper portion, or retention chamber, which is greater in diameter than the lower portion, so that the flow velocity of the water through the upper portion is reduced. This prevents media loss without the necessity of using a filter or other restraining means which could clog or otherwise impede the flow.

The treating media is provided in a particulate form so that it can be fluidized by the flow of a liquid. In preferred embodiments, the treating media is redox media which is granular and comprises metals having a favorable redox potential relative to the contaminants in the fluid to be treated. In the case of cooling tower water, the expected contaminants include chlorine, calcium carbonate as calcite, and microorganisms. Appropriate metals include aluminum, steel, zinc, tin, or copper in admixture or, preferably, as alloys. A preferred alloy is a mixture of copper and zinc.

In a specific preferred embodiment, the redox medium is granular high purity copper/zinc alloy in a 50:50 ratio atomized to have irregularly sized and shaped particles (US mesh screen size –10 to +100) sold under the mark KDF 55 by KDF Fluid Treatments, Inc., Three Rivers, Mich.

As a further advantage of the present system, the granular redox media has life of at least a year. Should the media become fouled by oils or grease, its performance can be restored by washing with a mild detergent. This washing can be accomplished by recirculating the detergent solution through the system followed by rinsing with fresh water. Further, when exhausted, redox media is 100% recyclable through current scrap metal recycling systems.

In preferred embodiments, the device of the present invention includes a physical filter which is placed in the system, prior to the treatment bed, to prevent entry of particulates, precipitated material and scale into the fluidized bed of the reaction chamber. For example, the manufacturing process for granular redox media results in particles of various sizes and shapes. The media is screened, but a significant amount of fines and flakes of low density still remain. During initial start-up, many of these particles escape into the system. Since a top screen in the column is impractical, as discussed above, any fines or flakes escaping into the system will be trapped by the filter.

In a preferred embodiment of the invention, the filter is a sand filter. In a particularly preferred embodiment, the sand filter is an automatic backwashing sand filtration unit having a stainless steel filter chamber, self-priming pump, automatic multiport valve assemblies, and coarse particle screen. The backwash cycle is dependent on pressure differential.

The bed is fluidized by contacting the treating media with a fluid in a countercurrent flow, specifically in an ascending manner against the force of gravity. The flow of fluidizing medium, which in the present example is the fluid to be treated, is at a velocity ranging from that required to fluidize the bed to that which win destabilize the bed, or cause back-mixing, channeling, or other turbulence. The maximum flow rate, however, is determined by the desired contact time of the fluid being treated with the treating media. In preferred embodiments, the fluid velocity may range from about 5 gal/min. to 20 gal/min. through a single column. In a cooling tower water treatment system embodiment, the reservoir water is preferably recirculated every 60 to 90 minutes. Typically, a treatment system comprises from one to four columns in parallel, but the system can be adapted to handle any number of columns required to control the flow rate through the treating media to that required for efficient removal of contaminants. In addition, the columns may be designed to accommodate flows greater than 20 gpm by proportionally sizing the upper and lower chambers. The number of columns is based on the volume of water in the reservoir.

A typical cooling tower water treatment system in accordance with the present invention comprises a heat exchanger, a cooling tower, a reservoir, and a treatment system. The treatment system includes a filtration unit for receiving water from the reservoir and a treatment bed for receiving filtered water from the filtration unit. The treatment bed may comprise one or more reaction columns, each column having top and bottom chamber portions. Of course, in operation, the columns contain fluidized redox media which is retained in the bottom reaction chamber portion by the upper retention chamber portion as described hereinabove. Although the embodiments described herein are in the form of a conventional cylindrical column, other configurations are within the contemplation of the invention.

In a method embodiment of the invention, a process of treating a fluid comprises filtering the fluid to remove particulates and treating the filtered fluid by contact with a treating, or redox, media. The redox media is contained in a lower reaction chamber of a treatment bed and held in place hydrodynamically by a reduction in flow rate in an upper retention chamber of the treatment bed having a diameter which is larger than the diameter of the reaction chamber. The redox media is fluidized by the pumping filtered fluid through the media in a direction countercurrent to the effect of gravity at a velocity sufficient to fluidize the media but not in excess of a velocity which would permit adequate contact time for reaction.

Because no additional chemicals are added to the water in the system, some of the constituents are actually precipitated from the water, the total dissolved solids (TDS) are actually reduced while the system tolerance for TDS is increased. Since TDS mandates blowdown, the frequency of blowdown is reduced. Moreover, the blowdown water is environmentally safe, containing only the constituents that are present in the make-up water. A small amount of dissolved sacrificial zinc may be present in the blowdown water, but tests have demonstrated that the zinc levels are well within the EPA maximum allowable limits for potable water.

Advantageously, treating cooling water with the redox media and subsequent filtration, in accordance with the invention, will end calcium hardness and prevent scale from forming. Over time, existing scale in a retrofit system will be removed.

Tests have confirmed that performance of the treatment bed is maintained at a steady level. Periodic visual inspection of heat exchangers, piping, and cooling tower surfaces have shown that no additional scale is formed and that previously existing scale is gradually removed. Moreover, water test data has shown that contaminant levels such as TDS, pH, alkalinity, calcium hardness, and heavy metals achieve steady equilibrium levels within 4 weeks of initial system operation. Moreover, tests have confirmed, that the equilibrium levels remain relatively constant over a 15 month period.

BRIEF DESCRIPTION OF THE DRAWING

Comprehension of the invention is facilitated by reading the following detailed description, in conjunction with the annexed drawing, in which:

FIG. 2 is an exploded representation of a treatment bed in accordance with the present invention.

DETAILED DESCRIPTION

Figure 1:
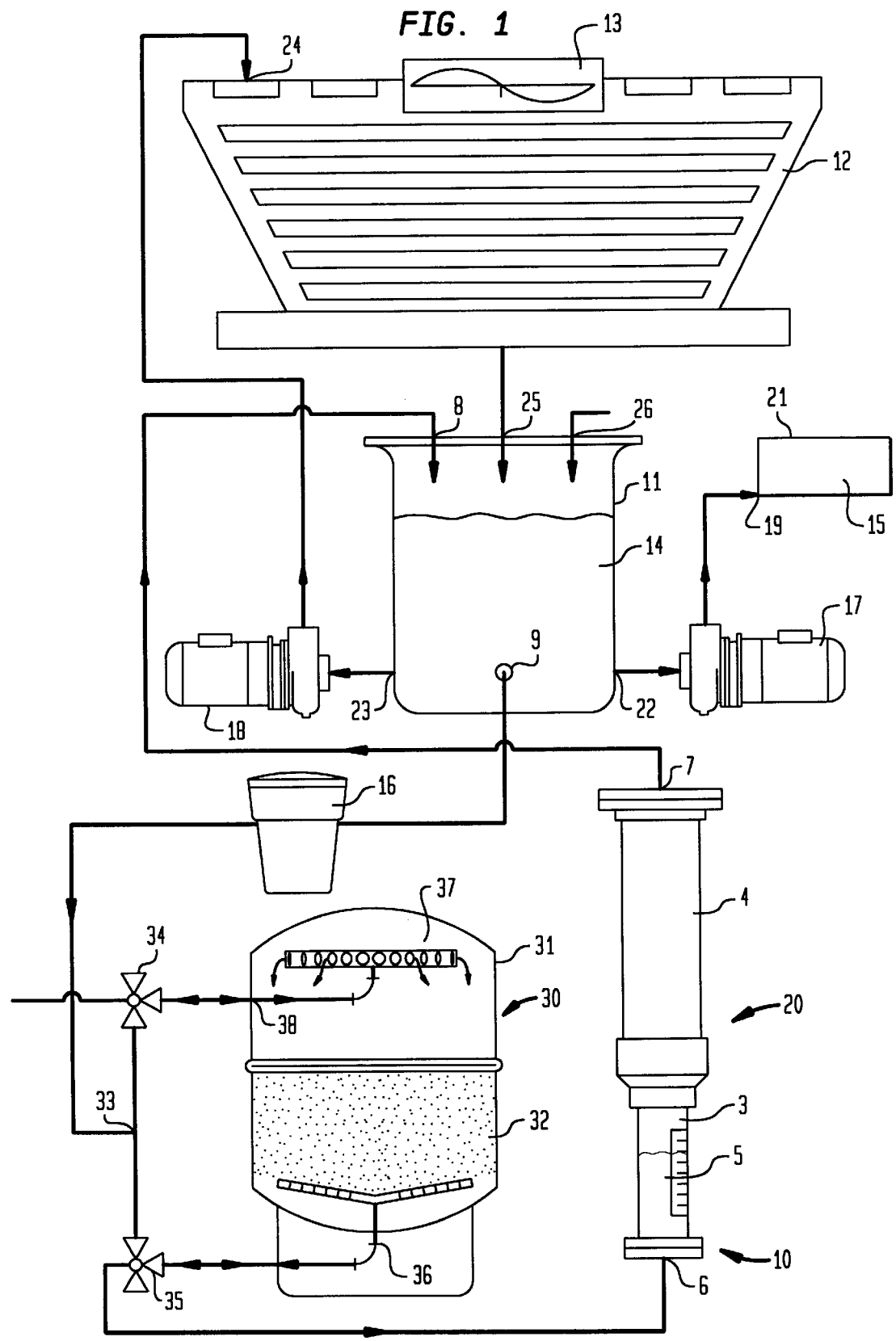
FIG. 1 is a schematic representation of a cooling tower treatment system in accordance with the present invention.

FIG. 1 is a schematic representation of a cooling tower treatment system in accordance with the present invention. A typical cooling tower system, portions of which are illustrated in FIG. 1, includes a reservoir 11 to hold a supply of reservoir water 14, a distribution piping network, pumps (e.g., 16, 17, 18), a heat exchanger 15, and cooling tower 12. Cooling tower 12 has a large surface area over which warm water cascades. Fans, such as fan 13, move air over the cascading water to facilitate lowering the temperature through evaporation. The tower discharge water returns to reservoir 11 for re-use. In many cases, the tower, and sometimes the reservoir, are located outside where they are exposed to sunlight and airborne contaminants. This creates an ideal environment for the growth of algae, bacteria, and fungi resulting in biofouling. As algae grows and dies, organic acids are created which contribute to corrosion of metallic surfaces. Moreover, as water evaporates, dissolved solids increase as the volume of water is decreased. Coupled with the heat of the water returning from the heat exchanger, it is common for scale, typically in the form of calcite, to form throughout the system. Heating efficiency is significantly reduced as calcite scale forms on the surface of the heat exchangers.

In order to mitigate the aforementioned problems, a portion of the water in reservoir 11 is directed through fluid treatment system 10 by pump 16. Reservoir 11, in this embodiment, contains reservoir water comprising warm water returned from heat exchanger 15, cool water discharged from cooling tower 12, and treated water received from treatment system 10.

In the specific embodiment illustrated in FIG. 1, treatment system 10 comprises a filtration unit (30) and a treatment bed 20 which is in the form of a column. The filtration unit is a sand filtration assembly in preferred embodiments. Referring to FIG. 1, sand filtration assembly 30 comprises a vessel 31 for holding sand filter media 32. Reservoir water discharged through reservoir outlet 9 enters filtration assembly 30 at filtration unit inlet 33. In the embodiment shown, three way valves 34 and 35 control the direction of flow of water through the filtration assembly for normal operation and backwash cycles. In normal operation, valves 34 and 35 are opened so that reservoir water is directed into the vessel through filter vessel inlet 38 and into feed distributor 37. Feed distributor 37 disperses reservoir water on the top of sand filter media 32. Particulates and scale are trapped by the sand as the water flows downward through the filter vessel. Filtered water exits the vessel at filtration unit outlet 36 and enters treatment bed inlet 6 through valve 35.

Periodically, valves 34 and 35 operate to create a backwash cycle. In the backwash cycle, reservoir water is directed into the filtration vessel though filtration unit outlet 36. Water travels upward through sand filter media 32, washing trapped particulates from the surface of the filter media, and exits the filter vessel at filter vessel inlet 38 through valve 34 to a backwash drain (not shown). In a preferred embodiment, the sand filter assembly automatically cycles into backwash when the pressure in the filter vessel exceeds a certain value. In this manner, the system continuously receives water from the reservoir and cooling tower yet maintains itself free from build-up of particulates, both in filtration assembly 30 and in the treatment bed 20 since only filtered reservoir water enters treatment bed inlet 6.

Treatment bed 20 comprises a reaction chamber 3 of a first diameter ($d_1$) and a retention chamber 4 of a second diameter ($d_2$). The value of $d_2$ is greater than the value of $d_1$ so that fluid flowing from reaction chamber 3 loses velocity when it enters retention chamber 4. A particulate treating media 5, which in preferred embodiments is redox media, is contained in reaction chamber 3 and is fluidized by the flow of reservoir water pumped into treatment bed 20 in a direction countercurrent to the flow of gravity. As shown in FIG. 1, reservoir water is pumped into treatment bed 20 through treatment bed inlet 6 and out through treatment system outlet 7. The fluidized media remains in reaction chamber 3 due to the decreased velocity of the water in retention bed 4 without the necessity of mechanical means, such as a screen or filter, which would be subject to clogging. The treated water exits treatment bed 20 and re-enters reservoir 11 through reservoir inlet 8.

Treatment bed 20 is shown in greater detail in the exploded representation of FIG. 2 where elements common to FIG. 1 retain the same reference numerals. Referring to FIG. 2, a distribution manifold 31 having a plurality of distribution orifices 32 distributes water entering treatment bed 20 through treatment bed inlet 6 across the bottom of the column. Proper distribution of liquid at the bottom of the bed facilitates uniform fluidization of redox media (not shown in this figure) in reaction chamber 3. Media retainer screen 33 supports the redox media. Reaction chamber 3, having diameter $d_1$, is coupled to retention chamber 4, having diameter $d_2$, by reducing coupling 34. Treatment system outlet 7 is at the top of the column and discharges treated water into reservoir inlet 8.

In a specific illustrative embodiment of the type shown in FIG. 2, reaction chamber 3 has an overall dimension of 6" in diameter by 24" in height. The chamber volume is 678 cubic inches (0.39 cubic feet). If the flow rate of water entering treatment bed inlet 6 is 20 gallons per minute, the flow velocity through reaction chamber 3 is 0.71 gallons per minute per square foot of surface area. Retention chamber 4, on the other hand, has an overall dimension of 8" in diameter by 24" in height. The resulting chamber volume is 1,206 cubic inches (0.70 cubic feet). For a flow rate of 20 gallons per minute, the flow velocity through retention chamber 4 is 0.40 gallons per minute per square foot of surface area. About 43 pounds of redox media has a volume of 336 cubic inches before fluidization which expands the volume of the redox media to about 504 cubic inches.

Pumps 16–18 create the flow of water in the direction of the arrows. The flow rate is controlled by flow regulators. In an illustrative embodiment, the flow is adjusted by a gate valve in response to a paddle wheel flow sensor with an indicator. Contact time with the redox media affects the speed and degree of removal of unwanted contaminants. Contact time can be adjusted by using smaller mesh granulated redox media and/or by reducing the fluid flow rate.

Returning to the water cooling tower system shown in FIG. 1, the treated water exits treatment system 10 at treatment system outlet 7 and returns to reservoir 11 through reservoir inlet 8. The reservoir water is discharged through reservoir outlet 23 and into cooling tower inlet 24 where it is cooled and returned through reservoir inlet 25. The cooled water is discharged through reservoir outlet 22 into heat exchanger inlet 19. Warm water from the heat exchanger returns to the reservoir from heat exchanger outlet 21 through reservoir inlet 26.

Of course, the system shown in FIG. 1 is for the purposes of illustration only and is not intended to be limiting. For example, the fluid treatment system 10 may comprise multiple columns. In this case, the treatment bed inlet 6 goes to a fluid distribution manifold (not shown) having multiple outlets for each column. Flow and pressure sensing meters and/or regulators and valves can be dispersed throughout the system as is known in the art. Inlets for chemicals, such as pH-adjusting compounds, or additional feedstreams can be added. The fluid being treated can also be brought into contact with other treating media, such as activated carbon, in a separate treatment bed. In the alternative, other treating media can be interspersed with redox media.

The inventive system is potentially useful in any industrial facility or commercial building using cooling towers. For example, many large buildings use cooling towers to provide cool make-up air for their air conditioning systems. In addition to the foregoing, the system can find use in other applications, such as boiler systems, chiller systems, quenching systems, and pre-conditioning systems used prior to ion-exchange treatment. Installation of treatment system 10 in an existing system is relatively simple, involving merely connecting the inlet and outlet piping to the reservoir, bringing power to a control panel, and running the backwash discharge to a sewer line.

Although the invention has been described in terms of specific embodiments and applications, persons skilled in the art can, in light of this teaching, generate additional embodiments without exceeding the scope or departing from the spirit of the claimed invention. For example, while the invention has been described in terms of industrial use, it can be adapted for any commercial or domestic use. Accordingly, it is to be understood that the drawing and description in this disclosure are proffered to facilitate comprehension of the invention, and should not be construed to limit the scope thereof.

What is claimed is:

1. A cooling tower water treatment system comprising:

a) a heat exchanger having a heat exchanger inlet and a heat exchanger outlet;

b) a cooling tower having a cooling tower inlet and a cooling tower outlet;

c) a reservoir having a first reservoir inlet for receiving warm water from the heat exchanger outlet, a second reservoir inlet for receiving cooled water from the cooling tower outlet, and a third reservoir inlet for receiving treated water from a treatment system, a first reservoir outlet for discharging reservoir water into the heat exchanger inlet, a second reservoir outlet for discharging reservoir water to the cooling tower inlet, and a third reservoir outlet for discharging reservoir water into the treatment system; and d) a treatment system having a filtration unit with a filtration unit inlet for receiving reservoir water from the third reservoir outlet, a first filtration unit outlet, and filter media intermediate the filtration unit inlet and the filtration unit outlet; a treatment bed in the form of a column, the treatment bed having a first chamber of a first diameter and a second chamber of a second diameter in fluid communication with the first chamber, the second diameter being larger than the first diameter, the first chamber having a treatment bed inlet for receiving water from the filtration unit, and the second chamber having a treatment system outlet for discharging treated water to the third reservoir inlet; and fluidized particulate treating media comprising a bimetallic alloy of copper and zinc in the first chamber, the treating media being fluidized by the flow of water from the treatment bed inlet to the treatment system outlet in a direction countercurrent to the flow of gravity.

2. The cooling tower water treatment system of claim 1 wherein the alloy is a 50:50 mixture of copper and zinc.

3. The cooling tower water treatment system of claim 1 wherein the filtration unit is provided with means for backwashing the filter media with reservoir water.

4. The cooling tower water treatment system of claim 3 wherein the means for backwashing the filter media comprises:

a valve system for directing the flow of reservoir water from the filtration unit inlet, through the filter media in a countercurrent direction, to a second filtration unit outlet.

5. The cooling tower water treatment system of claim 1 wherein the filter media is sand.

* * * * *